US008701817B2

(12) United States Patent
Schoen

(10) Patent No.: US 8,701,817 B2
(45) Date of Patent: Apr. 22, 2014

(54) IMPACT SENSITIVE LATCH ACTUATION LINK FOR VEHICLE DOOR

(75) Inventor: Robert M Schoen, Oxford, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/323,248

(22) Filed: Dec. 12, 2011

(65) Prior Publication Data

US 2013/0146382 A1 Jun. 13, 2013

(51) Int. Cl.
*B60K 28/12* (2006.01)
*E05B 65/12* (2006.01)

(52) U.S. Cl.
CPC ................. *E05B 77/04* (2013.01); *E05B 77/10* (2013.01)
USPC .......................................... 180/281; 292/196

(58) Field of Classification Search
CPC ..... E05B 13/101; E05B 15/004; E05B 77/02; E05B 77/04; E05B 77/10; E05C 3/124
USPC .............. 180/281; 292/216, DIG. 3, DIG. 27, 292/DIG. 62, DIG. 65, 196
See application file for complete search history.

(56) References Cited

U.S. PATENT DOCUMENTS

| | | | | | |
|---|---|---|---|---|---|
| 2,187,933 | A | * | 1/1940 | Craig | 180/281 |
| 2,827,321 | A | * | 3/1958 | Leslie et al. | 292/5 |
| 3,228,719 | A | * | 1/1966 | Klueger | 292/336.3 |
| 4,283,155 | A | * | 8/1981 | Yamazaki et al. | 403/163 |
| 5,069,493 | A | * | 12/1991 | Mochida et al. | 292/336.3 |
| 5,253,906 | A | * | 10/1993 | Rogers et al. | 292/216 |
| 5,431,462 | A | * | 7/1995 | Lignell | 292/336.3 |
| 5,492,379 | A | * | 2/1996 | Staser et al. | 292/336.3 |
| 5,584,516 | A | | 12/1996 | Cetnar | |
| 5,709,498 | A | * | 1/1998 | Sova et al. | 403/196 |
| 5,934,817 | A | * | 8/1999 | Kim et al. | 403/196 |
| 6,003,910 | A | * | 12/1999 | Dupont et al. | 292/201 |
| 6,042,159 | A | * | 3/2000 | Spitzley et al. | 292/216 |
| 6,099,052 | A | * | 8/2000 | Spitzley | 292/336.3 |
| 6,241,294 | B1 | * | 6/2001 | Young et al. | 292/336.3 |

(Continued)

FOREIGN PATENT DOCUMENTS

| | | | |
|---|---|---|---|
| DE | 102005023123 | A1 | 3/2006 |
| DE | 102008021158 | A1 | 10/2009 |
| FR | 2918693 | A1 | 1/2009 |
| GB | 2361675 | A | 10/2001 |

OTHER PUBLICATIONS

International Search Report dated Apr. 17, 2013 for International Application No. PCT/US2012/067749, International Filing Date Dec. 4, 2012.

(Continued)

*Primary Examiner* — Joseph M Rocca
*Assistant Examiner* — Timothy Wilhelm
(74) *Attorney, Agent, or Firm* — Ralph E Smith

(57) ABSTRACT

An apparatus may include a latch mechanism, an actuator, and an actuation link. The latch mechanism may be movable to allow and restrict movement of a vehicle door relative to a vehicle frame. The actuator may be configured to be movable by a user to cause corresponding movement of the latch mechanism. The actuation link may interconnect the latch mechanism and the actuator. The actuation link may include a portion that is laterally compliant to absorb a lateral force and axially rigid to transmit motion of the actuator to the latch mechanism.

18 Claims, 4 Drawing Sheets

(56) References Cited

U.S. PATENT DOCUMENTS

| | | | | |
|---|---|---|---|---|
| 6,264,257 | B1 * | 7/2001 | Meinke | 292/336.3 |
| 6,880,867 | B2 * | 4/2005 | Schoen et al. | 292/216 |
| 9,880,867 | | 4/2005 | Schoen et al. | |
| 7,080,532 | B2 * | 7/2006 | Bucker et al. | 70/208 |
| 7,568,740 | B2 * | 8/2009 | Brose et al. | 292/216 |
| 8,128,151 | B2 * | 3/2012 | Teramoto et al. | 296/146.1 |
| 8,235,451 | B2 * | 8/2012 | Jordan et al. | 296/146.1 |
| 2004/0251693 | A1 | 12/2004 | Schoen et al. | |
| 2007/0029835 | A1 * | 2/2007 | Herline et al. | 296/146.1 |
| 2007/0069525 | A1 * | 3/2007 | Ghannam | 292/216 |
| 2007/0120382 | A1 * | 5/2007 | Chevalier | 292/336.3 |
| 2010/0019512 | A1 * | 1/2010 | Gschweng et al. | 292/217 |
| 2010/0109350 | A1 * | 5/2010 | Gschweng et al. | 292/196 |
| 2011/0062747 | A1 | 3/2011 | Teramoto | |
| 2011/0258935 | A1 * | 10/2011 | Heller | 49/502 |

OTHER PUBLICATIONS

Written Opinion dated Apr. 17, 2013 for International Application Na PCT/US2012/067749, International Filing Date Dec. 4, 2012.

* cited by examiner

IMPACT SENSITIVE LATCH ACTUATION LINK FOR VEHICLE DOOR

FIELD

The present disclosure relates to a vehicle door, and more particularly, to an impact sensitive latch actuation link for vehicle door.

BACKGROUND

A vehicle may include doors having a handle or push-button assembly or other actuator disposed on interior and exterior sides of the doors. Each of the handle or push-button assemblies may be connected to a latch mechanism that selectively secures the door in a closed position. A user may actuate the handle or push-button assembly on either the interior side or the exterior side of the door, which in turn actuates the latch mechanism and allows the door to be opened. The present disclosure provides a link that connects the handle or push-button assembly to the latch mechanism and allows the latch mechanism to be actuated in response to input from a user and restricts or prevents unwanted actuation of the latch mechanism during an impact event.

SUMMARY

The present disclosure provides an apparatus that may include a latch mechanism, an actuator, and a continuous actuation link. The latch mechanism may be movable to allow and restrict movement of a vehicle door relative to a vehicle frame. The actuator may be configured to be movable by a user to cause corresponding movement of the latch mechanism. The actuation link may interconnect the latch mechanism and the actuator. The actuation link may include a portion that is laterally compliant to absorb a lateral force and axially rigid to transmit motion of the actuator to the latch mechanism.

The lateral compliance of the portion of the actuation link allows a first end of the actuation link to move laterally relative to a second end of the actuation link in response to a lateral force. A clip may engage the portion and maintain the portion in a partially compressed condition. The clip may be operable to disengage the portion in response to an intrusion event. The portion of the actuation link may include a single uninterrupted length of rod and may form a substantially Z-shape. The portion of the actuation link may include a substantially uniform diameter and may be formed from a single material.

The vehicle door includes an interior side facing an interior of the vehicle and an exterior side facing outward from the vehicle. In some embodiments, the actuator is disposed on the interior side. In other embodiments, the actuator is disposed on the exterior side.

The present disclosure also provides an apparatus that may include a latch mechanism, an actuator, an actuation link, and a retainer. The latch mechanism may be movable to allow and restrict movement of a vehicle door relative to a vehicle frame. The actuator may be configured to be actuated to cause corresponding movement of the latch mechanism. The actuation link may interconnect the latch mechanism and the actuator and may include a first portion and a second portion. The retainer may engage the first and second portions and allow motion of the first portion in a first direction to be transferred to the second portion. The retainer may break in response to motion of the first portion in a second direction to disconnect the first and second portions from each other and restrict motion of the first portion in the second direction from being transferred to the second portion.

The retainer may be axially rigid to transfer axial motion of the first portion to the second portion. The retainer may break in response to a lateral force and allow the first and second portions to be disconnected from each other. The retainer may include a polymeric material formed over and substantially encasing ends of the first and second portions. The retainer may include a stress riser feature formed therein to facilitate material failure (e.g., bending, fracturing, stretching, etc.) of the retainer in response to a lateral force.

In some embodiments, adjacent ends of the first and second portions may include retaining features engaging the retainer. In some embodiments, the adjacent ends of the first and second portions may include laterally extending members engaging each other to increase an axial strength of the actuation link.

The first portion of the actuation link may extend between the actuator and the retainer and the second portion may extend between the latch mechanism and the retainer.

The vehicle door includes an interior side facing an interior of the vehicle and an exterior side facing outward from the vehicle. The actuator can be disposed on the interior side or the exterior side.

Further areas of applicability of the present disclosure will become apparent from the detailed description, claims and drawings provided hereinafter. It should be understood that the detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

When an element or component is referred to as being "on," "engaged to," "connected to," or "coupled to" another element or component, it may be directly on, engaged, connected or coupled to the other element or component, or intervening elements or components may be present. In contrast, when an element or component is referred to as being "directly on," "directly engaged to," "directly connected to," or "directly coupled to" another element or component, there may be no intervening elements or components present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

DETAILED DESCRIPTION

Figure 1:
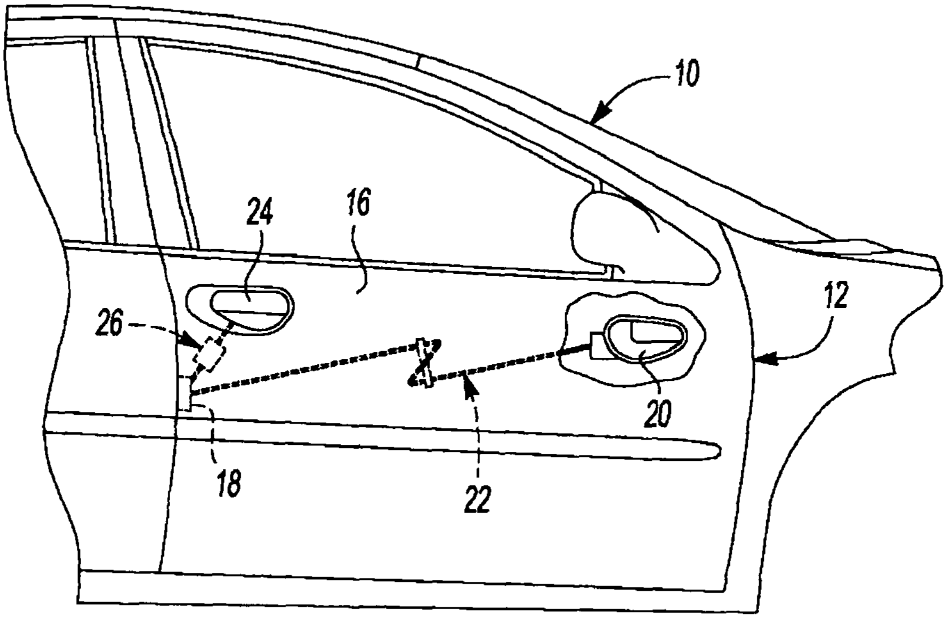
FIG. 1 is a partial side view of an exterior of a vehicle including a door having first and second door latch actuation mechanisms according to the principles of the present disclosure.
Figure 2:
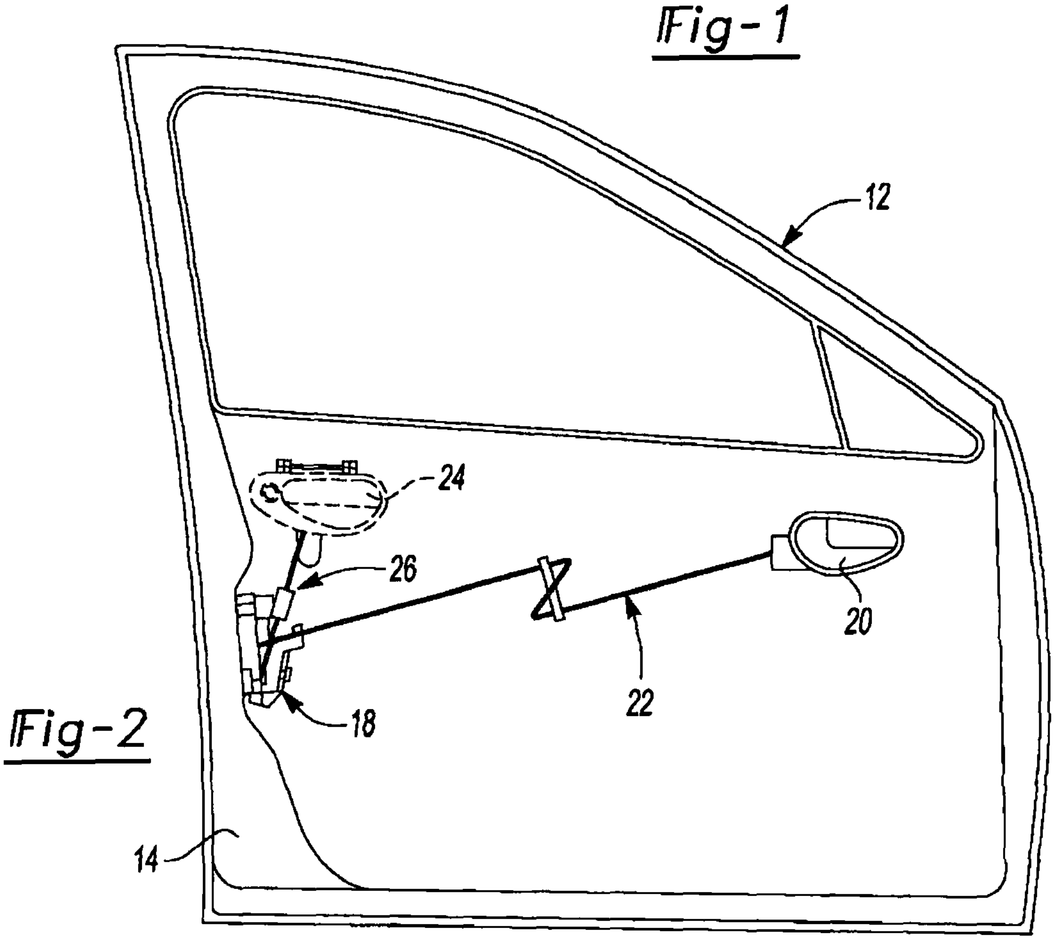
FIG. 2 is a side view of an interior side of the door of FIG. 1.

In an exemplary embodiment and with reference to FIGS. 1-7, a vehicle 10 is provided that may include a plurality of doors 12 providing ingress into and egress out of an interior or cabin of the vehicle 10. One or more of the doors 12 may include an interior side panel 14, an exterior side panel 16, a latch mechanism 18, an interior door handle or actuator 20, a first actuation link 22, an exterior door handle or actuator 24, and a second actuation link 26. The first and second actuation links 22, 26 operatively connect the latch mechanism 18 with the interior and exterior actuators 20, 24, respectively, to allow a user to move the latch mechanism 18 from an engaged position to a disengaged position by actuating the interior or exterior actuators 20, 24 to allow the user to open the door 12 to enter or exit the cabin of the vehicle 10. As will be subsequently described, the first and second actuation links 22, 26 are configured to move the latch mechanism 18 from the engaged position to the disengaged position in response to the user's intentional actuation of the actuators 20, 24, respectively, but will fail to move the latch mechanism 18 from the engaged position to the disengaged position in response to a force applied to the actuation links 22, 26, respectively, during a side intrusion event or other side impact event. The term "intrusion event," as it is used herein may refer to or include deflection of the interior and/or exterior side panels 14, 16 of the door 12 inward toward an interior of the vehicle 10 due to an impact event.

The latch mechanism 18 may be disposed between the interior and exterior side panels 14, 16 and can be any suitable mechanism operable to selectively move a latch between an engaged position and a disengaged position relative to a frame of the door 12. In the engaged position, the latch mechanism 18 prevents the door 12 from moving from a closed position (shown in FIG. 1) toward an open position. In the disengaged position, the latch mechanism 18 allows the door 12 to be moved from the closed position toward the open position.

As described above, the interior and exterior actuators 20, 24 may be connected to the latch mechanism 18 by the first and second actuation links 22, 26, respectively. The interior and exterior actuators 20, 24 may include a handle, a lever, a push-button, and/or any other mechanism adapted to move the actuation links 22, 26 and perform the functionality described herein. The interior actuator 20 may be disposed on the interior side panel 14 and is accessible to and operable by a user sitting inside the vehicle 10. The exterior actuator 24 may be disposed on the exterior side panel 16 and is accessible to and operable by a user situated outside of the vehicle 10.

Figure 3:
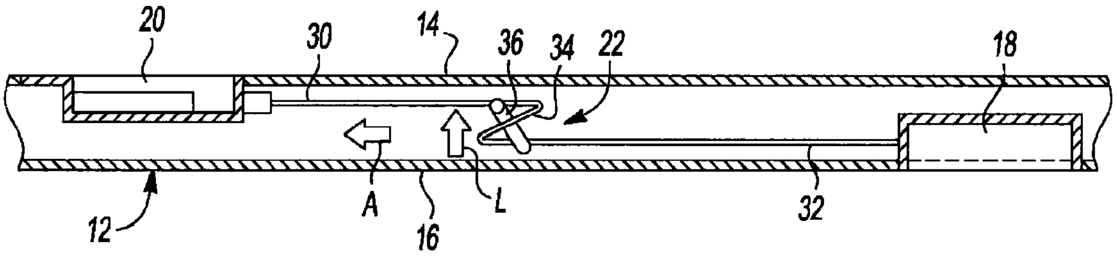
FIG. 3 is a schematic representation of the door and the first door latch actuation mechanism.
Figure 4:
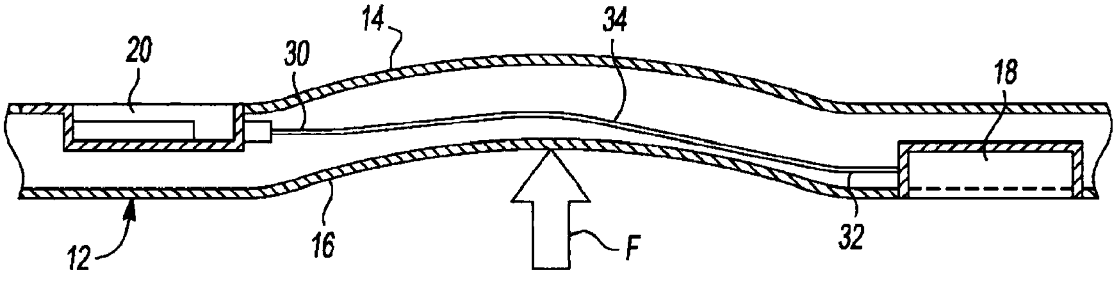
FIG. 4 is a schematic representation of the door and the first door latch actuation mechanism during an intrusion event.

The first actuation link 22 may be disposed between the interior and exterior side panels 14, 16 and may be a continuous rod including a first portion 30, a second portion 32, and a laterally compliant portion 34. In some embodiments, the first actuation link 22 may be formed from steel or aluminum, for example. The laterally compliant portion 34 may be disposed between the first and second portions 30, 32, as shown in FIG. 3. The first portion 30 may be operatively connected to the interior actuator 20 and the second portion 32 may be operatively connected to the latch mechanism 18. The laterally compliant portion 34 may be formed by bending a portion of the first actuation link 22 connecting the first and second portions 30, 32 into a generally Z-shape or S-shape, for example. The Z-shape of the laterally compliant portion 34 may be resiliently compressible and expandable and may absorb or dampen lateral forces applied to the first actuation link 22.

The structure of the first actuation link 22 described above allows the first actuation link 22 to be substantially rigid in an axial direction A, yet relatively compliant in a lateral direction L that may be substantially perpendicular to the axial direction A. The diameter, material and stiffness of the rod forming the first actuation link 22 may be customized to suit the construction and constraints of the particular doors, interior actuators, and latch mechanisms of a given vehicle. While the first and second portions 30, 32 are shown in the figures as being generally linear, it will be appreciated that in some embodiments, the first and/or second portions 30, 32 could include one or more curved sections to accommodate packaging constraints within the door 12.

A breakaway clip 36 (shown schematically in FIGS. 1-3) may engage the first and second portions 30, 32 to retain the laterally compliant portion 34 is a compressed state, as shown in FIG. 3. The clip 36 may be a generally C-shaped member, for example, and may be resiliently flexible to allow the clip 36 to selectively disengage the first and/or second portions 30, 32 in response to a lateral force applied to the first actuation link 22 due to an intrusion event, for example. While the clip 36 is described above as being generally C-shaped, it will be appreciated that the clip 36 could be shaped or configured in any other suitable manner to accomplish the functionality described herein. The clip 36 may improve the axial rigidity of the first actuation link 22 by restricting an initial lateral expansion of the laterally compliant portion 34 until a predetermined amount of lateral force and/or lateral deflection causes the clip 36 to snap off of (or disengage) the first and second portions 30, 32. Once the clip 36 disengages the first and second portions 30, 32, the lateral compliance of the first actuation link 22 is increased as the laterally compliant portion 34 is allowed to more freely expand toward the shape shown in FIG. 4. In this manner, the clip 36 may improve axial rigidity during normal and purposeful operation of the door 12 by the user, yet still allow sufficient lateral compliance during an intrusion event to avoid unintended actuation of the latch mechanism 18. It will be appreciated, however, that in some embodiments, the first actuation link 22 need not include the clip 36 to provide acceptable axial rigidity.

Lateral compliance of the first actuation link 22 during an intrusion event or other side impact event may restrict or prevent the first actuation link 22 from transmitting forces (e.g., due to deflection of the exterior side panel 16 during an intrusion event or lateral inertial forces resulting from a side impact event) through the first actuation link 22 to the latch mechanism 18. For example, as the exterior side panel 16 deflects inward and applies a lateral force (in the direction L) to the first actuation link 22, the laterally compliant portion 34 is allowed to expand without pulling the first and second portions 30, 32 in an axial direction. In this manner, the forces of the intrusion event are absorbed or dampened in the laterally compliant portion 34 without being transmitted in an axial direction through the first and second portions 30, 32 so that the latch mechanism 18 is not actuated (i.e., moved to the disengaged position) during a side impact or intrusion event. In this manner, the first actuation link 22 may restrict or prevent the door 12 from being inadvertently opened during the intrusion or side impact event.

Figure 5:
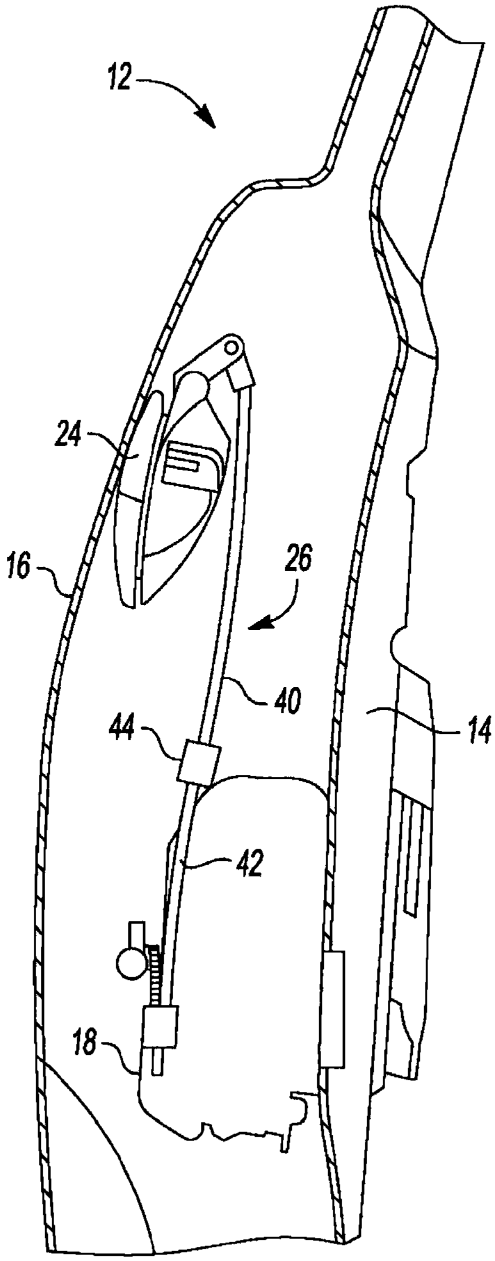
FIG. 5 is a schematic representation of the door and the second door latch actuation mechanism.
Figure 6:
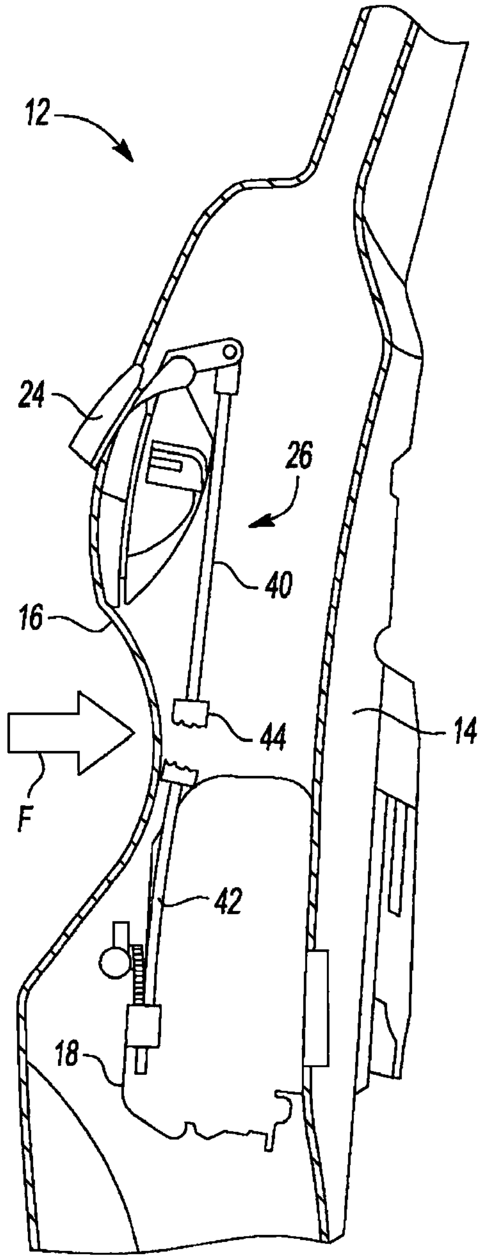
FIG. 6 is a schematic representation of the door and the second door latch actuation mechanism during an intrusion event.

The second actuation link 26 may be disposed between the interior and exterior side panels 14, 16 and may include a first portion 40, a second portion 42, and a retainer 44 connecting the first and second portions 40, 42, as shown in FIG. 5. The first and second portions 40, 42 may be formed from a relatively axially rigid metallic or polymeric rods. The first portion 40 may be operatively connected to the exterior actuator 24 and the second portion 42 may be operatively connected to the latch mechanism 18. Movement of the exterior actuator 24 may cause axial movement of the second actuation link 26 in an upward direction (relative to the view shown in FIG. 5) to cause corresponding movement of the latch mechanism 18 into the disengaged position. The particular diameter, material and stiffness of the rods forming the first and second portions 40, 42 may be customized to suit the construction and constraints of the particular doors, exterior actuators, and latch mechanisms of a given vehicle. In some embodiments, the first and second portions 40, 42 may be formed from steel or aluminum, for example.

One or more retaining features 46 (FIG. 7) that engage the retainer 44 may be disposed at or proximate adjacent ends of the first and second portions 40, 42. In the particular embodiment illustrated in FIG. 7, the retaining features 46 of the first and second portions 40, 42 are may extend laterally outward from the distal ends of the first and second portions 40, 42 to form a generally L-shape.

Figure 7:
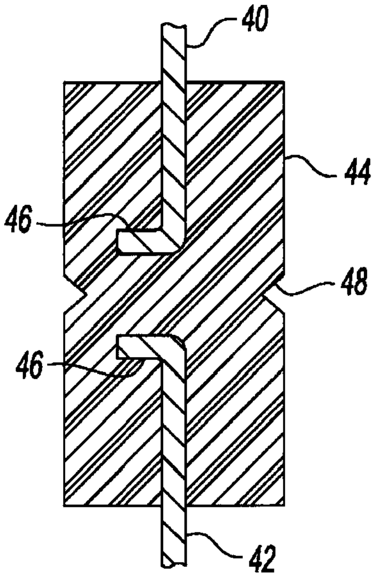
FIG. 7 is a partial cross-sectional view of an actuation link of the second door latch actuation mechanism according to the principles of the present disclosure.

The retainer 44 may be formed from a polymeric material, for example, and may be molded over or otherwise encase the retaining features 46 and the adjacent ends of the first and second portions 40, 42 to connect the first and second portions 40, 42 to each other. As shown in FIG. 7, adjacent ends of the first and second portions 40, 42 may be generally axially aligned with each other. The specific material, dimensions and shape of the retainer 44 may be customized to break or fracture (FIG. 6) in response to being subjected to a lateral force F of a predetermined magnitude from an intrusion event or other side impact event, for example. In some embodiments, the retainer 44 may include a perforation, cutout or relief 48 (FIG. 7), for example, or any other stress riser to facilitate fracturing.

The structure and function of the retainer 44 may restrict or prevent the second actuation link 26 from transmitting forces (e.g., due to deflection of the exterior side panel 16 during an intrusion event or lateral inertial forces resulting from a side impact event) through the second actuation link 26 to the latch mechanism 18. For example, as the exterior side panel 16 deflects inward and applies a lateral force (in the direction of the lateral force F) to the second actuation link 26, the retainer 44 may be allowed to break apart to separate the first and second portions 40, 42 before the second portion 42 can be pulled axially upward to actuate the latch mechanism 18. In this manner, the second actuation link 26 may restrict or prevent the door 12 from being inadvertently opened during the intrusion or side impact event. The retainer 44 and the retaining features 46 may cooperate to hold the first and second portions 40, 42 together and provide axial rigidity to allow for efficient transmission of movement of the exterior actuator 24 to the latch mechanism 18 during normal and purposeful operation of the door 12 by the user.

While the interior actuator 20 is described above as being connected to the latch mechanism 18 by the first actuation link 22, and the exterior actuator 24 is described above as being connected to the latch mechanism 18 by the second actuation link 26, in some embodiments, the first actuation link 22 could be configured to operatively couple the exterior actuator 24 and the latch mechanism 18 and/or the second actuation link 26 may be configured to operatively couple the interior actuator 20 and the latch mechanism 18.

Figure 8:
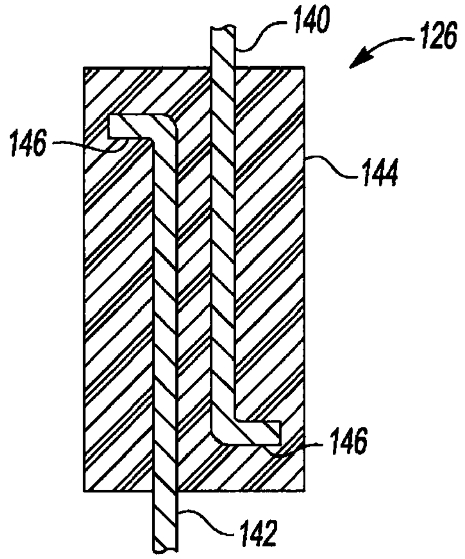
FIG. 8 is a partial cross-sectional view of another actuation link of the second door latch actuation mechanism according to the principles of the present disclosure.

With reference to FIG. 8, another embodiment of a second actuation link 126 is provided. The structure and function of the second actuation link 126 may be substantially similar to that of the second actuation link 26 described above, apart from any exceptions noted below or shown in the figures. The second actuation link 126 may include first and second portions 140, 142 and a retainer 144. The first portion 140 may be connected to the exterior actuator 24, and the second portion 142 may be connected to the latch mechanism 18. The retainer 144 may connect adjacent ends of the first and second portions 140, 142 to each other. The first and second portions 140, 142 may each include retaining features 146 to facilitate engagement with the retainer 144.

Unlike the first and second portions 40, 42, the first and second portions 140, 142 may be laterally offset (i.e., axially misaligned) from each other. As shown in FIG. 8, the first and second portions 140, 142 may extend axially through a substantial portion of the retainer 44. In some embodiments, the first and second portions 140, 142 may extend axially through more than half of a length of the retainer 144. In other embodiments, the first and second portions 140, 142 may extend axially through more than seventy-five percent (75%) of the length of the retainer 144. Generally, the more surface area of engagement that exists between the retainer 144 and the first and second portions 140, 142, the more robust the engagement will be between the retainer 144 and the first and second portions 140, 142.

Figure 9:
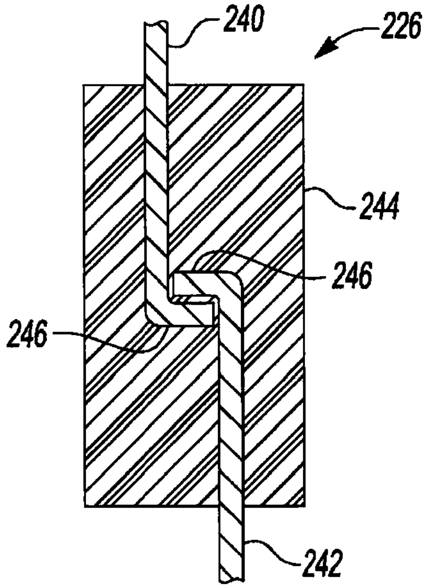
FIG. 9 is a partial cross-sectional view of yet another actuation link of the second door latch actuation mechanism according to the principles of the present disclosure.

With reference to FIG. 9, another embodiment of a second actuation link 226 is provided. The structure and function of the second actuation link 226 may be substantially similar to that of the second actuation link 26 described above, apart from any exceptions noted below or shown in the figures. The second actuation link 226 may include first and second portions 240, 242 and a retainer 244. The first portion 240 may be connected to the exterior actuator 24, and the second portion 242 may be connected to the latch mechanism 18. The retainer 244 may connect adjacent ends of the first and second portions 240, 242 to each other. The first and second portions 240, 242 may each include a retaining feature 246 to facilitate engagement with the retainer 244.

Like the first and second portions 140, 142, the first and second portions 240, 242 may be laterally offset relative to each other. The retaining feature 246 of the first portion 240 may extend toward the second portion 242, and the retaining feature 246 of the second portion 242 may extend toward the first portion 240. Such a configuration may provide additional axial strength and rigidity for the second actuation link 226, as relative axial movement between the first and second portions 240, 242 may be restricted or prevented by interference between the retaining features 246 of the first and second portions 240, 242.

Figure 10:
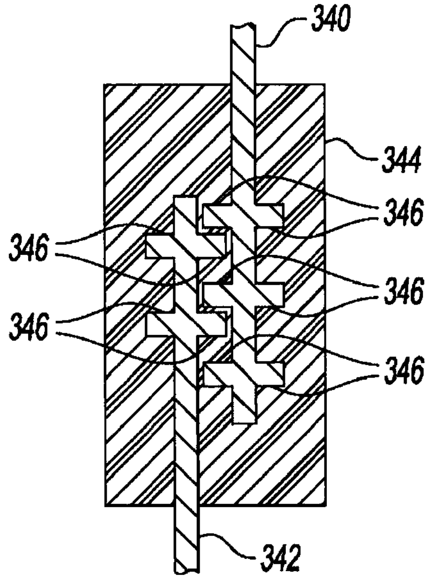
FIG. 10 is a partial cross-sectional view of still another actuation link of the second door latch actuation mechanism according to the principles of the present disclosure.

With reference to FIG. 10, another embodiment of a second actuation link 326 is provided. The structure and function of the second actuation link 326 may be substantially similar to that of the second actuation link 26 described above, apart from any exceptions noted below or shown in the figures. The second actuation link 326 may include first and second portions 340, 342 and a retainer 344. The first portion 340 may be connected to the exterior actuator 24, and the second portion 342 may be connected to the latch mechanism 18. The retainer 344 may connect adjacent ends of the first and second portions 340, 342 to each other. The first and second portions 340, 342 may each include a plurality of retaining features 346 to facilitate engagement with the retainer 344.

Like the first and second portions 240, 242, the first and second portions 340, 342 may be laterally offset relative to each other. The first and second portions 340, 342 may each include a plurality of retaining features 346 spaced axially apart from each other. The retaining features 346 may extend laterally in both directions from each of the first and second portions 340, 342. Each retaining feature 346 of the first portion 340 may be axially offset from adjacent retaining features 346 of the second portion 342. Such a configuration may provide additional axial strength and rigidity for the second actuation link 326, as relative axial movement between the first and second portions 340, 342 may be restricted or prevented by interference between the retaining features 346 of the first and second portions 340, 342.

It will be appreciated that in other embodiments, the retainers 44, 144, 244, 344 and/or the retaining features 46, 146, 246, 346 can be shaped and/or configured in any other way to provide a desired amount of axial strength, rigidity, and integrity and/or a desired amount of lateral strength or weakness.

What is claimed is:

1. An apparatus comprising:

a latch mechanism movable to allow and restrict movement of a vehicle door relative to a vehicle frame;

an actuator configured to be movable to cause corresponding movement of the latch mechanism;

a continuous actuation link interconnecting the latch mechanism and the actuator, the actuation link having a portion that is laterally compliant to absorb a lateral force and axially rigid to transmit motion of the actuator to the latch mechanism; and a clip engaging the portion and maintaining the portion in a partially compressed condition, wherein the portion of the actuation link includes a single uninterrupted length of rod.

2. The apparatus of claim 1, wherein the lateral compliance of the portion of the actuation link allows a first end of the actuation link to move laterally relative to a second end of the actuation link in response to a lateral force.

3. The apparatus of claim 1, wherein the clip is operable to disengage the portion in response to an intrusion event.

4. The apparatus of claim 1, wherein the actuation link is a rod, and the portion of the actuation link forms a substantially Z-shape.

5. The apparatus of claim 1, wherein the portion of the actuation link has a substantially uniform diameter and is formed from a single material.

6. The apparatus of claim 1, further comprising an interior side of the vehicle door facing a cabin of the vehicle, the actuator being disposed on the interior side.

7. The apparatus of claim 1, further comprising an exterior side of the vehicle door facing outward from the vehicle, the actuator being disposed on the exterior side.

8. An apparatus comprising:

a latch mechanism movable to allow and restrict movement of a vehicle door relative to a vehicle frame;

a first actuator configured to be movable to cause corresponding movement of the latch mechanism;

a continuous first actuation link interconnecting the latch mechanism and the first actuator, the first actuation link having a portion that is laterally compliant to absorb a lateral force and axially rigid to transmit motion of the first actuator to the latch mechanism, the portion of the first actuation link including a single uninterrupted length of rod;

a second actuator;

a second actuation link coupled with the second actuator; and a retainer engaging first and second portions of the second actuation link and allowing motion of the first portion in a first direction to be transferred to the second portion, the retainer breaking in response to motion of the first portion in a second direction to restrict motion of the first portion in the second direction from being transferred to the second portion.

9. The apparatus of claim 8, further comprising a clip engaging the portion and maintaining the portion in a partially compressed condition.

10. The apparatus of claim 9, wherein the clip is operable to disengage the portion in response to an intrusion event.

11. The apparatus of claim 8, wherein the actuation link is a rod, and the portion of the actuation link forms a substantially Z-shape.

12. The apparatus of claim 8, wherein the portion of the actuation link has a substantially uniform diameter and is formed from a single material.

13. An apparatus comprising:

a latch mechanism movable to allow and restrict movement of a vehicle door relative to a vehicle frame;

an actuator configured to be movable to cause corresponding movement of the latch mechanism; and a continuous actuation link interconnecting the latch mechanism and the actuator, the actuation link having first and second ends and a folded portion disposed therebetween, the folded portion being laterally compliant to absorb a lateral force by unfolding to increase the length of the actuation link in response to an intrusion event without moving the first and second ends, the folded portion being axially rigid to transmit motion of the actuator to the latch mechanism.

14. The apparatus of claim 13, wherein the folded portion is a single uninterrupted length of rod.

15. The apparatus of claim 13, further comprising a clip engaging the folded portion and maintaining the folded portion in a partially compressed condition.

16. The apparatus of claim 15, wherein the clip is operable to disengage the folded portion in response to the intrusion event.

17. The apparatus of claim 13, wherein the actuation link is a rod, and the folded portion of the actuation link forms a substantially Z-shape.

18. The apparatus of claim 13, wherein the folded portion of the actuation link has a substantially uniform diameter and is formed from a single material.

* * * * *